(12) United States Patent
Chu et al.

(10) Patent No.: US 7,772,782 B2
(45) Date of Patent: Aug. 10, 2010

(54) LIGHT EMITTING DIODE (LED) DRIVING DEVICE

(75) Inventors: Yi-Shan Chu, Hsin-Chu (TW); Hsing-Kuo Chao, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 425 days.

(21) Appl. No.: 11/951,293

(22) Filed: Dec. 5, 2007

(65) Prior Publication Data

US 2009/0146575 A1 Jun. 11, 2009

(51) Int. Cl.
*H05B 41/24* (2006.01)

(52) U.S. Cl. .................. 315/247; 315/219; 315/224; 315/291; 363/21.02

(58) Field of Classification Search .............. 315/210, 315/211, 212, 219, 224, 225, 226, 246, 247, 315/250, 254, 276, 283, 291, 294, 307, 308; 363/15–21.04
See application file for complete search history.

(56) References Cited

U.S. PATENT DOCUMENTS

| | | | | |
|---|---|---|---|---|
| 5,053,937 A | * | 10/1991 | Blockl | 363/16 |
| 6,826,059 B2 | * | 11/2004 | Bockle et al. | 363/17 |
| 7,567,040 B2 | * | 7/2009 | Pong et al. | 315/276 |
| 7,573,729 B2 | * | 8/2009 | Elferich et al. | 363/21.02 |
| 2002/0186026 A1 | * | 12/2002 | Elferich | 324/652 |

* cited by examiner

*Primary Examiner*—Douglas W Owens
*Assistant Examiner*—Ephrem Alemu
(74) *Attorney, Agent, or Firm*—Winston Hsu

(57) ABSTRACT

A light emitting diode (LED) driving device includes a power factor correction (PFC) circuit, a bridge switch circuit, a resonant circuit, a transformer and a feedback circuit. The PFC circuit adjusts an output signal thereof based on a feedback signal. The bridge switch circuit transforms the output signal of the PFC circuit into a pulse signal. The resonant circuit resonates and outputs a sinusoidal signal to a primary-side of the transformer based on the pulse signal. The feedback circuit outputs the feedback signal to the PFC circuit in response to a primary-side current of the transformer. Therefore, an output current of the LED driving device is adjusted through modulating the feedback circuit.

14 Claims, 5 Drawing Sheets

LIGHT EMITTING DIODE (LED) DRIVING DEVICE

BACKGROUND OF THE INVENTION

1. Field of the Invention

The present invention relates to a light emitting diode (LED) driving device, and more particularly, to an LED driving device suitable for high power output to drive at least one LED module.

2. Description of the Prior Art

Light emitting diodes (LED) are light emitting elements manufactured of semiconductor materials. Unlike the conventional lighting, the LED belongs to cold lighting and has plenty of advantages, such as high brightness, high lighting efficiency, uncomplicated driving circuits, low power consumption, and fast response. The LED has gradually replaced the conventional lighting.

Circuit designs of the LED driving device usually adopt a design for isolating the primary-side from the secondary-side of a transformer for safety considerations. Please refer to FIG. 1. An input voltage Vin is rectified by a bridge rectifier circuit 110 to generate a primary-side voltage V1. Herein the primary-side voltage V1 is approximately $\sqrt{2}$ times the input voltage Vin. For example, when the input voltage Vin is an alternating-current voltage of 110V (volt), the primary-side voltage V1 rectified by the bridge rectifier circuit 110 is a direct-current voltage of about 156V. A pulse width modulation (PWM) controller 120 controls a power switch Q1 through an output PWM signal Vg to make the primary-side voltage V1 of a transformer 130 transform into a secondary-side of the transformer 130. Therefore, an output voltage Vo is generated to light the LED serially connected to the output end. Taking flyback topology as an example, when the power switch Q1 is turned on, energy is stored in a magnetized inductance LP of the primary-side of the transformer 130. At this time, the secondary-side is turned off. When the power switch Q1 is turned off, the energy stored in the magnetized inductance LP of the primary-side of the transformer is released to the secondary-side for further generating the output voltage Vo. Herein the output voltage Vo is a direct-current (DC) voltage.

A current signal $I_{LED}$ flowing through the LED determines the voltage level of a compensation pin COMP of the PWM controller 120 according to a linear voltage regulator TL and a photo coupler 140. The PWM controller 120 adjusts the PWM signal Vg according to the voltage level of the compensation pin COMP, that is, to adjust the duty cycle of the power switch Q1. In other words, the current signal $I_{LED}$ is stabilized according to a reference voltage Vref of the linear voltage regulator TL and a resistor $R_{LED}$, which means $I_{LED}=Vref/R_{LED}$. Therefore, if the number of LEDs at the output end increases, the output power becomes larger, the duty cycle of the PWM signal Vg for controlling the power switch Q1 becomes larger, and vice versa.

When being applied to high power output (i.e., there are many LEDs connected to the output end), a power factor correction circuit (PFC) 150 is usually added into the front-end to satisfy current harmonic standards, as is shown in FIG. 2.

Please refer to FIG. 2. The AC input voltage Vin is adjusted by the bridge rectifier circuit 110 and the PFC circuit 150 to generate a DC primary-side voltage V2. For example, if the input voltage Vin is 110V (AC), the generated primary-side voltage V2 is about 200V (DC). If the input voltage Vin is about 220V (AC), the generated primary-side voltage V2 is about 400V (DC).

There are two feedback paths inside the PFC circuit 150. One path is a current feedback path 152 used for making the waveform of the input current Iin follow the waveform of the input voltage Vin and be in phase with the input voltage Vin to improve the power factor to satisfy current harmonic standards. The other path is a voltage feedback path 154, which adjusts the input current Iin through the feedback of the primary-side voltage V2 to further stabilize the primary-side voltage V2.

However, the circuit design for such driving circuit must utilize the linear voltage regulator and the photo coupler to isolate the primary-side from the secondary-side. In addition, in high power output (greater than 150 W) applications, a transformer of large-scale is necessary, which results in increasing cost, occupying space, and accompanying complicated thermal dissipation problems. Besides, the whole driving circuit must use two independent controller ICs (integrated circuit), i.e., the PFC controller and the PWM controller. Not only circuit designs become more complicated, but also cost becomes more expensive.

SUMMARY OF THE INVENTION

It is one of the objectives of the claimed invention to provide an LED driving device to solve the problems of complicated circuit design and high cost existing in the prior art.

According to an embodiment, an LED driving device is disclosed in the present invention. The LED driving device includes a power factor correction (PFC) circuit, a bridge switch circuit, a resonant circuit, a transformer and a feedback circuit. The PFC circuit adjusts an output signal according to a feedback signal. The bridge switch circuit is coupled to an output end of the PFC circuit for transforming the output signal of the PFC circuit into a pulse signal. The resonant circuit is coupled to an output end of the bridge switch circuit for resonating and outputting a sinusoidal signal according to the pulse signal. A primary-side of the transformer has a first end coupled to the resonant circuit for receiving the sinusoidal signal. The feedback circuit is coupled to a second end of the primary-side of the transformer for outputting the feedback signal to a feedback end of the PFC circuit in response to a primary-side current of the transformer.

The bridge switch circuit can be a half-bridge circuit, which includes a pair of switch elements in series. The pair of switch elements is coupled between the output end of the PFC circuit and a ground end, and the joint point of the pair of switch elements is coupled to the resonant circuit. Herein driving control signals of the pair of switch elements can be a pair of complementary control signals, which are respectively inputted to control ends of the two switch elements of the half-bridge circuit. The pair of complementary control signals has a duty cycle of 50%.

The resonant circuit is composed of a capacitor and an inductor.

The feedback circuit can include a resistor and a rectifier element. The resistor of the feedback circuit is coupled between the second end of the primary-side of the transformer and a ground end. The primary-side current flows through the resistor to form an alternating-current voltage across the resistor, and the rectifier element rectifies the alternating-current voltage to generate the feedback signal.

The feedback circuit can further include a filtering element for filtering the feedback signal to provide a filtered feedback signal to the PFC circuit.

The secondary-side of the transformer is further coupled to at least one LED module, and the value of the resistor in the feedback circuit is corresponding to the brightness of the LED module.

The LED driving device disclosed in the present invention utilizes the primary-side current of the transformer to control feedback, and thus linear voltage regulators and light couplers are not needed to isolate the primary-side from the secondary-side of the transformer to prevent danger of an electric shock when changing output LEDs, which can reduce cost. In addition, the LED driving device disclosed in the present invention adjusts the output current (i.e., the secondary-side current of the transformer) through adjusting the value of the resistor in the feedback circuit, for example, adjusting the resistance of the resistor Rcs, to control the brightness of the LED modules. Compared with the prior art, the control manner is much simpler. Furthermore, the LED driving device disclosed in the present invention is suitable for high output power applications (for example, >200 W). Within the LED driving device disclosed in the present invention, only a single controller with feedback function (i.e., the PFC) is used and its control circuit is much simpler and the whole cost is cheaper.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
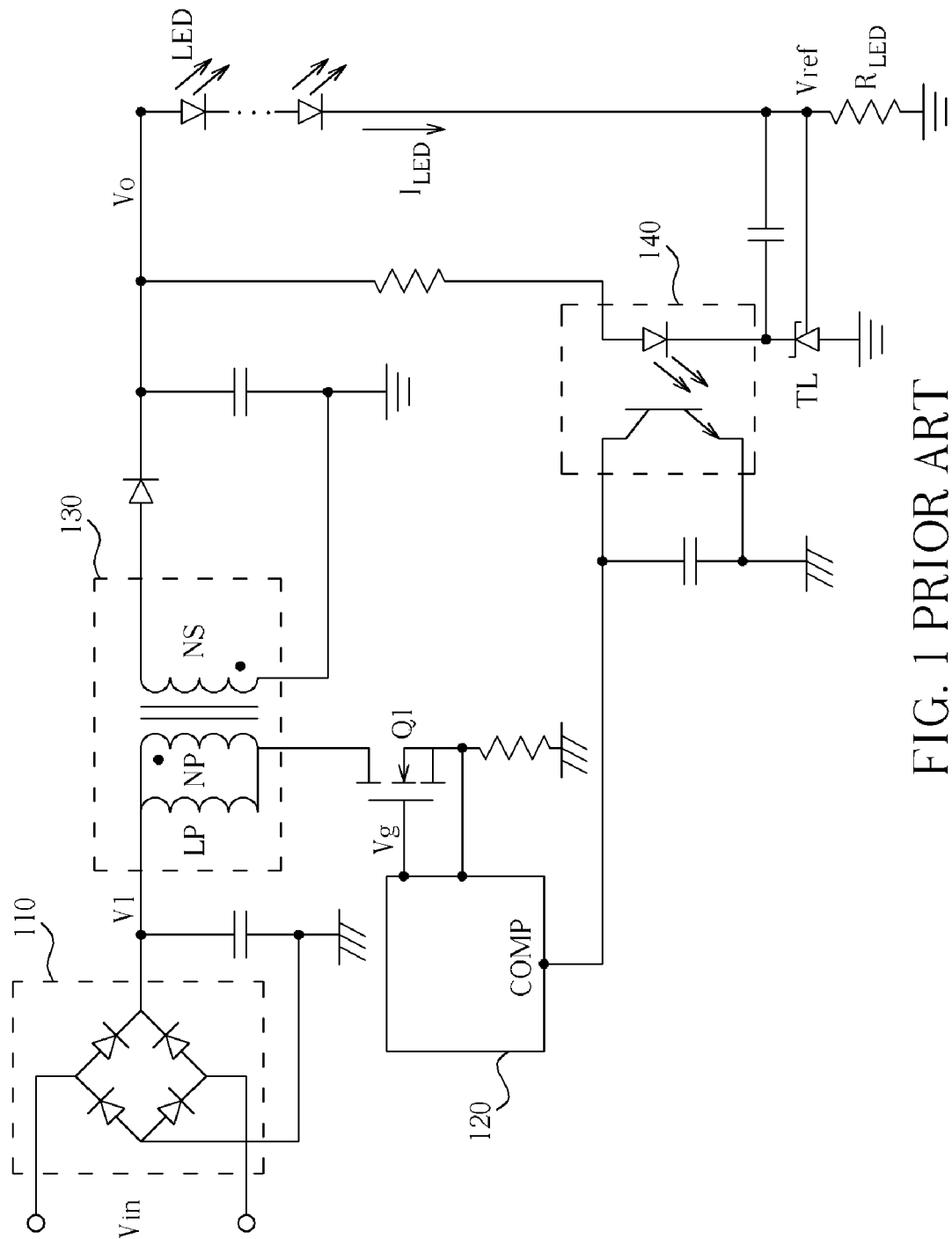
FIG. 1 is a diagram of an LED driving device according to the prior art.
Figure 2:
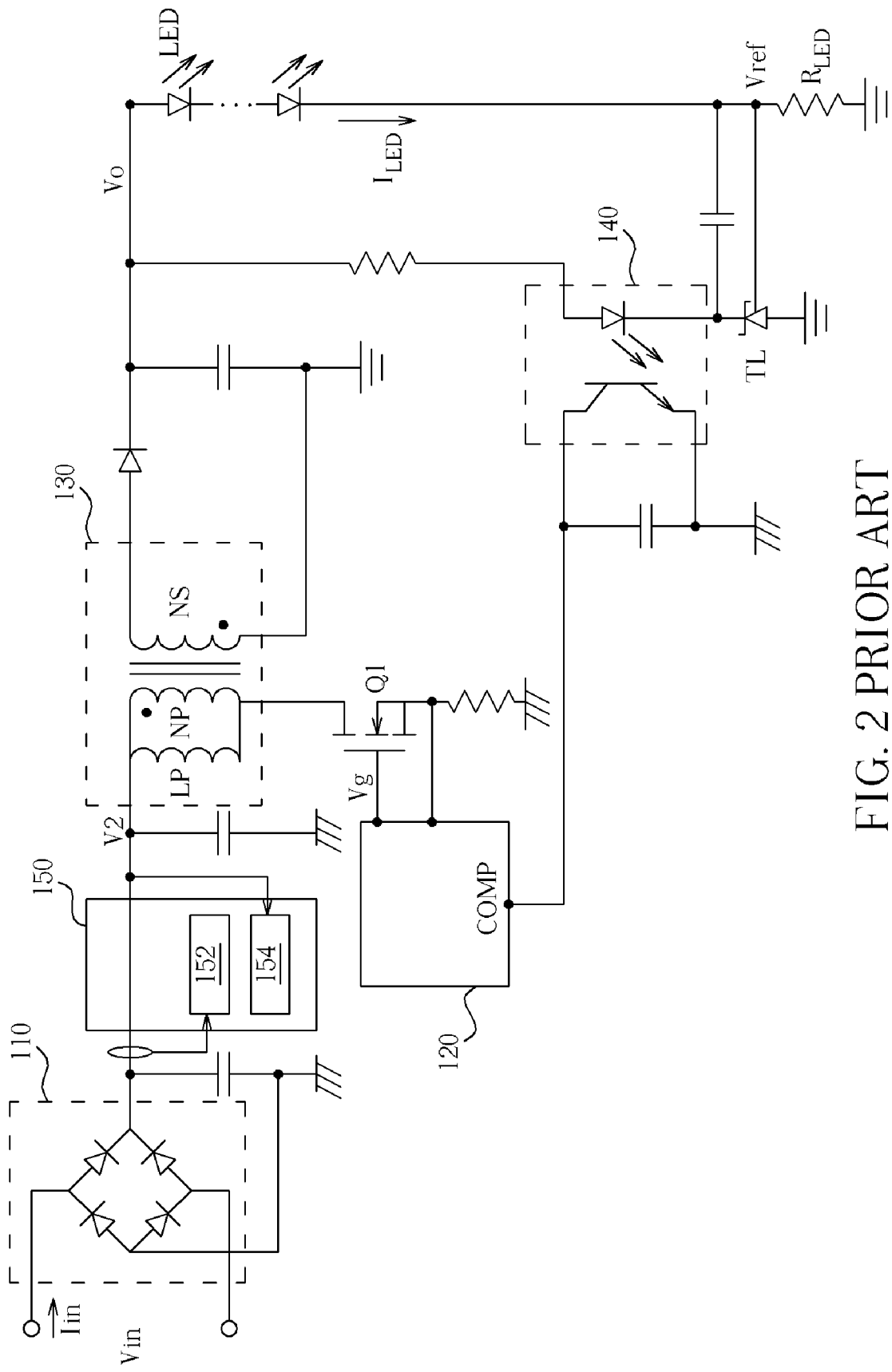
FIG. 2 is a diagram of another LED driving device according to the prior art.
Figure 3:
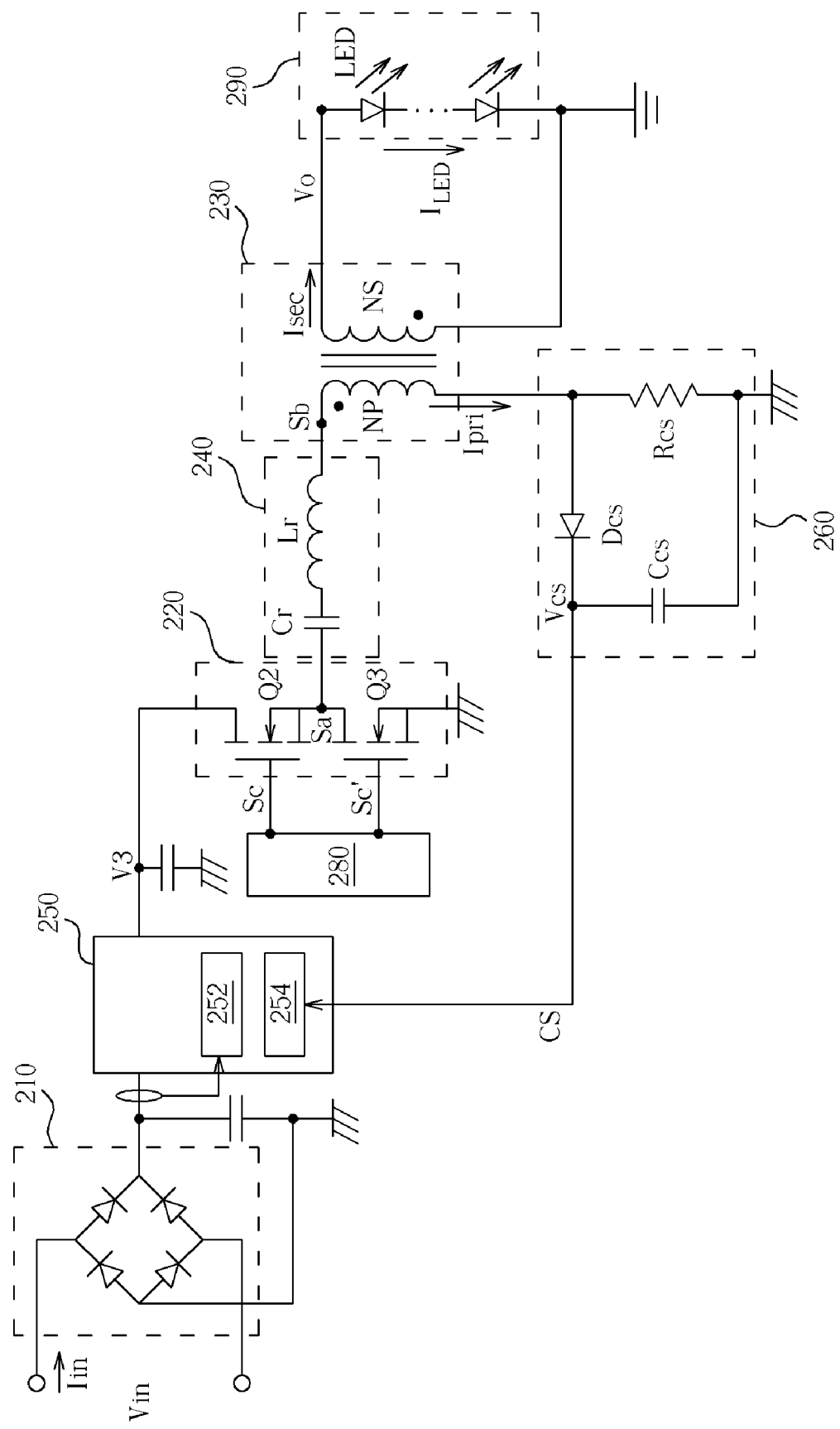
FIG. 3 is a diagram of an LED driving device according to an embodiment of the present invention.

Please refer to FIG. 3. FIG. 3 is a diagram of an LED driving device according to an embodiment of the present invention. The LED driving device includes a bridge switch circuit 220, a transformer 230, a resonant circuit 240, a power factor correction (PFC) circuit 250, and a feedback circuit 260.

The PFC circuit 250 is coupled between a bridge rectifier circuit 210 and the bridge switch circuit 220. The resonant circuit 240 is coupled between the bridge switch circuit 220 and a first end of the primary-side of the transformer 230. The feedback circuit 260 is coupled between a second end of the primary-side of the transformer 230 and a voltage feedback end of the PFC circuit 250.

The input voltage Vin is rectified by the bridge rectifier circuit 210 and then inputted to the PFC circuit 250. The PFC circuit 250 includes two feedback paths. A current feedback path 252 is connected to the bridge switch circuit 220 to make the waveform of the input current Iin follow the waveform of the input voltage Vin and be in phase with the input voltage Vin. A voltage feedback path 254 receives a feedback signal CS from the feedback circuit 260 and adjusts the input current Iin according to the feedback signal CS to adjust an output signal V3 of the PFC circuit 250. In other words, the PFC circuit 250 can adjust its output signal V3 according to the feedback signal CS.

The bridge switch circuit 220 transforms the output signal V3 of the PFC circuit 250 into a pulse signal Sa. The pulse signal Sa is then resonated by the resonant circuit 240 to generate a sinusoidal signal Sb at the primary-side of the transformer 230, and a primary-side current Ipri of the transformer 230 is also a sinusoidal signal. That is to say, the resonant circuit 240 receives the pulse signal Sa and outputs the sinusoidal signal Sb. The feedback circuit 260 outputs the feedback signal CS according to the primary-side current Ipri of the transformer 230.

The bridge switch circuit 220 can be a full-bridge switch circuit or a half-bridge switch circuit. In this embodiment, a half-bridge switch circuit is adopted, the bridge switch circuit 220 includes a pair of switch elements Q2 and Q3 in series. Herein the switch elements Q2 and Q3 are connected between an output end of the PFC circuit 250 and a ground end, and the joint point of the pair of switch elements Q2 and Q3 is coupled to an input end of the resonant circuit 240. Herein a pair of complementary control signals Sc and Sc' can be used to control operations of the two switch elements Q2 and Q3. The pair of complementary control signals Sc and Sc' can be a pair of complementary pulse signals. The pair of complementary control signals Sc and Sc' are respectively inputted to the control ends of the switch elements Q2 and Q3 to make them switch interlacedly according to the pair of complementary control signals Sc and Sc' to transform the output signal V3 of the PFC circuit 250 into the pulse signal Sa. Herein the pair of complementary control signals Sc and Sc' having a duty cycle of 50% can be used.

Furthermore, a signal generator 280 can be disposed inside the LED driving device to generate control signals to drive the bridge switch circuit 220.

The resonant circuit 240 comprises a capacitor Cr and an inductor Lr. One end of the capacitor Cr is coupled to the bridge switch circuit 220, and the other end of the capacitor Cr is coupled to the inductor Lr. One end of the inductor Lr relative to the capacitor Cr is coupled to the first end of the primary-side of the transformer 230.

In one embodiment, the capacitor Cr is coupled between the joint point of the switch elements Q2 and Q3 and the inductor Lr for receiving the pulse signal Sa generated by the switch of the switch elements Q2 and Q3.

The feedback circuit 260 includes a resistor Rcs and a rectifier element Dcs. The resistor Rcs is coupled between the primary-side of the transformer 230 and the ground end. The rectifier element Dcs is coupled between the resistor Rcs and the PFC circuit 250. The primary-side current Ipri of the transformer 230 flowing through the resistor Rcs forms an alternating-current voltage across the resistor Rcs, and the alternating-current voltage across the resistor Rcs is rectified by the rectifier element Dcs to generate the feedback signal CS.

Herein the feedback circuit 260 further includes a filter element Ccs. Therefore, after the alternating-current voltage across the resistor Rcs is rectified by the rectifier element Dcs and filtered by the filter element Ccs, the feedback signal CS is generated to the PFC circuit 250.

Herein the LED driving device can also adopt a playback topology. In addition, the circuits of the primary-side and the secondary-side of the transformer 230 can adopt different ground ends.

At the secondary-side of the transformer 230, a LED module 290 comprising at least one or several LEDs can be coupled to the output end of the LED driving device. The brightness of the LED module 290 can be controlled through adjusting the feedback circuit 260, that is adjusting the resistance of resistor Rcs. In other words, the resistance of the resistor Rcs corresponds to the brightness of the LED module 290.

Herein if the resistance of the resistor Rcs is adjusted, the voltage Vcs of the feedback signal CS is changed according to the resistance of the resistor Rcs. The output signal V3 is adjusted by the PFC circuit 250 according to the feedback signal CS, therefore, the output signal V3 is altered according to the change of the feedback signal CS. Then, the peak voltage of the pulse signal Sa is influenced, and the peak voltage of the sinusoidal signal Sb is altered. Based on the characteristics of the transformer 230, the secondary-side current Isec equals the primary-side current Ipri multiplied by the turn ratio (NP/NS) of the transformer 230. Therefore, changing the primary-side current Ipri of the transformer 230 is equivalent to changing the secondary-side current Isec of the transformer 230. For example, if increases the resistance of the resistor Rcs, the voltage value Vcs of the feedback signal CS is increased, too. Thereby the primary-side current Ipri of the transformer 230 is lowered and the secondary-side current Isec relative to the primary-side current Ipri is lowered. Because the primary-side current Ipri of the transformer 230 is lowered, the voltage value Vcs of the feedback signal CS is lowered. Finally, the voltage value Vcs of the feedback signal CS is stabilized at a constant value. Herein the resistor Rcs can adopt a variable resistance for the convenience of adjusting the brightness.

In other words, the brightness of the LED module 290 can be adjusted through changing the value of the resistor Rcs of the feedback circuit 260.

Moreover, due to the resonant frequency of the resonant circuit 240 being over a KHz, no twinkling phenomenon of the LED module 290 will be observed by human eyes.

Figure 4:
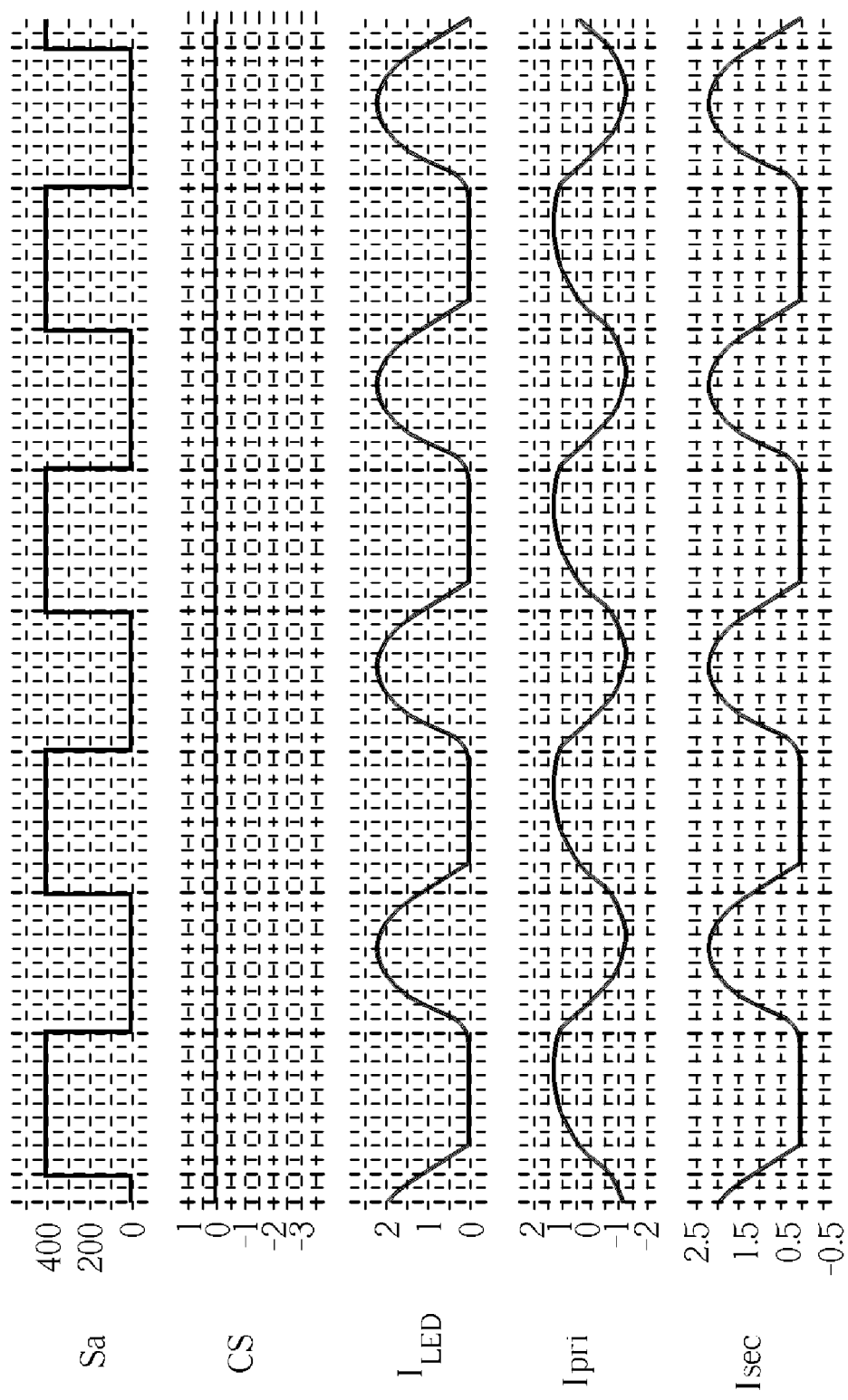
FIG. 4 is a waveform diagram of each signal in FIG. 3.

Taking flyback topology as an example, the waveforms of the pulse signal Sa, the feedback signal CS, the current signal $I_{LED}$ flowing through the LED module 290, the primary-side current Ipri and the secondary-side current Isec of the transformer 230 are shown in FIG. 4.

Figure 5:
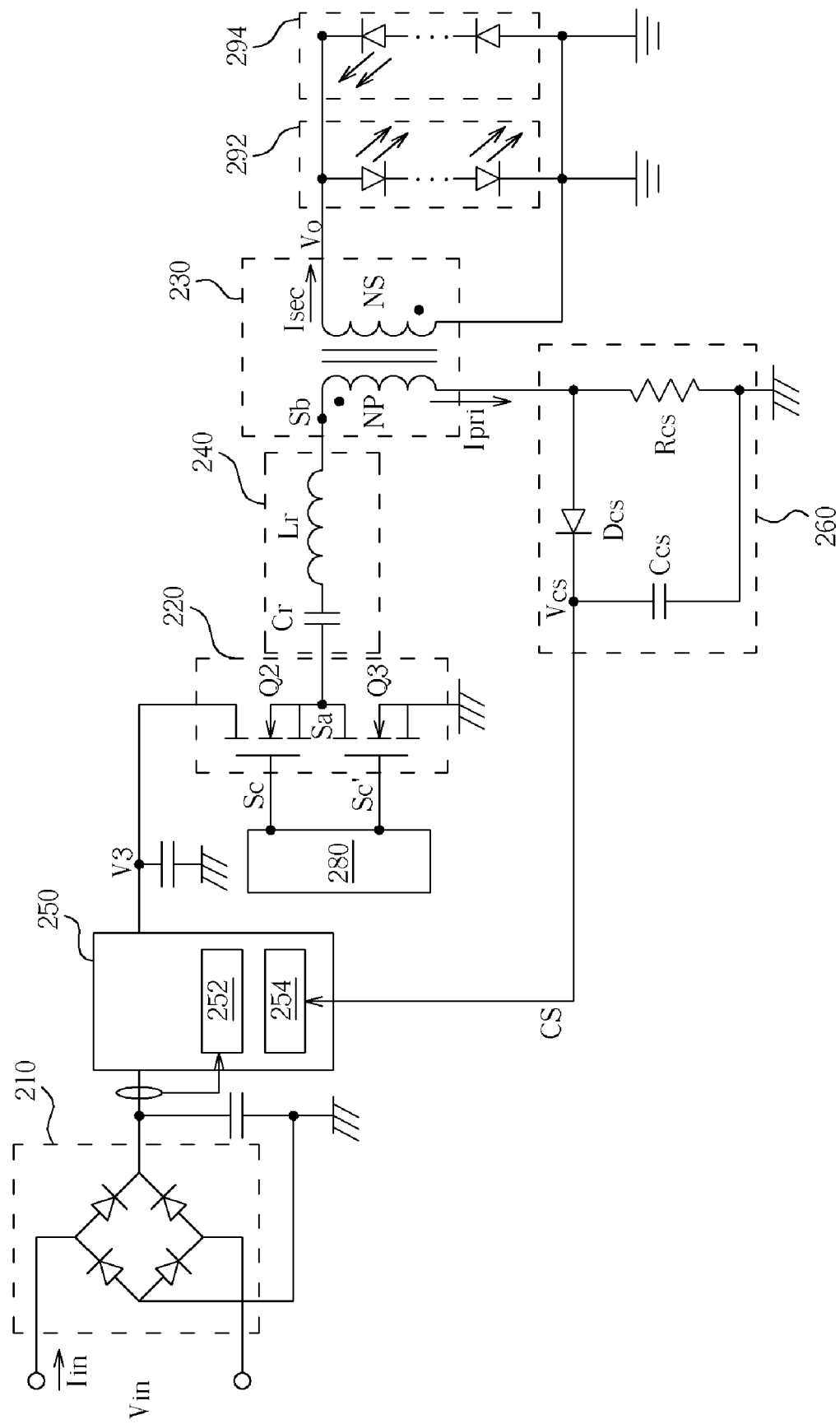
FIG. 5 is a diagram of an LED driving device according to another embodiment of the present invention.

In another embodiment, referring to FIG. 5, at the secondary-side of the transformer, a first LED module 292 and a second LED module 294 can be coupled to the output end of the LED driving device. The first LED module 292 and the second LED module 294 are oppositely connected in parallel. That is, the first LED module 292 and the second LED module 294 are oppositely coupled to two ends of the secondary-side of the transformer 230. Herein the transformer 230 provides the output voltage Vo at the secondary-side to drive the first LED module 292 and the second LED module 294 according to the primary-side current Ipri. The output voltage Vo is an AC sinusoidal signal and drives the first LED module 292 during a positive half-cycle and drives the second LED module 294 during a negative half-cycle. In other words, the transformer 230 respectively drives the first LED module 292 and the second LED module 294 according to the primary-side current Ipri. The resistance of the resistor Rcs corresponds to the brightness of the two LED modules 292 and 294.

Because the LED driving device of the present invention uses the primary-side current of the transformer to do feedback control, the primary-side and the secondary-side of the transformer are separated from each other. Therefore, not only the cost of the linear voltage regulator and the photo coupler and the whole space volume can be saved, but also the danger of an electric shock when changing output LEDs can be prevented. In addition, only the resistance of the resistor of the feedback circuit in the LED driving device of the present invention needs to be adjusted, for example, the resistance of the resistor Rcs is adjusted, to adjust the secondary-side current of the transformer. Thereby the brightness of the LED module can be controlled. When compared with the prior art, the control manner of the present invention is simpler. Furthermore, the LED driving device of the present invention is suitable for high output power applications (such as >200 W). Within the LED driving device of the present invention, only a single controller with feedback function is used (i.e., the PFC circuit), which has simpler circuitry and cheaper cost.

Although the preferred embodiments of the present invention have been disclosed above, they should not be considered limitations of the present invention. It will be obvious to those skilled in the art that various modifications may be made without departing from what is intended to be limited solely by the appended claims.

Those skilled in the art will readily observe that numerous modifications and alterations of the device and method may be made while retaining the teachings of the invention.

What is claimed is:

1. A light emitting diode (LED) driving device comprising:
   a power factor correction (PFC) circuit, for adjusting an output signal according to a feedback signal;
   a bridge switch circuit, coupled to the PFC circuit, for transforming the output signal from the PFC circuit into a pulse signal;
   a resonant circuit, coupled to the bridge switch circuit, for outputting a sinusoidal signal according to the pulse signal;
   a transformer, a first end of a primary-side of the transformer coupled to the resonant circuit, for receiving the sinusoidal signal; and
   a feedback circuit, coupled to a second end of the primary-side of the transformer, for outputting the feedback signal corresponding to a primary-side current of the transformer.

2. The LED driving device of claim 1, wherein the bridge switch circuit is a half-bridge switch circuit, comprising a pair of switch elements in series, the pair of switch elements coupled between an output end of the PFC circuit and a ground end, and a joint point of the pair of switch elements coupled to the resonant circuit.

3. The LED driving device of claim 2, wherein the pair of switch elements are driven by a pair of complementary control signals.

4. The LED driving device of claim 2 further comprising:
   a signal generator, coupled to control ends of the pair of switch elements, for controlling the pair of switch elements.

5. The LED driving device of claim 4, wherein the signal generator generates the pair of complementary control signals to control the pair of switch elements.

6. The LED driving device of claim 5, wherein the pair of complementary control signals has a duty cycle of 50%.

7. The LED driving device of claim 1 further comprising:
   a signal generator, coupled to the bridge switch circuit, for driving the bridge switch circuit.

8. The LED driving device of claim 1, wherein the resonant circuit comprises:
   a capacitor, having one end coupled to the bridge switch circuit, for receiving the pulse signal; and
   an inductor, coupled between another end of the capacitor and the first end of the primary-side of the transformer, for outputting the sinusoidal signal.

9. The LED driving device of claim 1, wherein the feedback circuit comprises:

a resistor, coupled between the second end of the primary-side of the transformer and a ground end, wherein the primary-side current flows through the resistor to form an alternating-current voltage across the resistor; and a rectifier element, rectifying the alternating-current voltage across the resistor to generate the feedback signal.

10. The LED driving device of claim 9, wherein the feedback circuit further comprises a filtering element, for filtering the feedback signal to provide a filtered feedback signal to the PFC circuit.

11. The LED driving device of claim 9, wherein the secondary-side of the transformer is coupled to a first LED module, and the resistance of the resistor corresponds to the brightness of the first LED module.

12. The LED driving device of claim 11, wherein the secondary-side of the transformer is further coupled to a second LED module, the second LED module is reversely coupled to the first LED module in parallel, and the resistance of the resistor corresponds to the brightness of the second LED module.

13. The LED driving device of claim 1, wherein the secondary-side of the transformer is coupled to a first LED module, and the transformer drives the first LED module according to the primary-side current.

14. The LED driving device of claim 13, wherein the secondary-side of the transformer is further coupled to a second LED module, the second LED module is reversely coupled to the first LED module in parallel, and the transformer drives the first LED module and the second LED module by turns according to the primary-side current with an alternating current.

* * * * *